Sept. 4, 1934.  R. J. HAUG  1,972,736
VISCOSITY INDICATING DEVICE
Filed May 22, 1929  2 Sheets-Sheet 1

Inventor.
Richard J. Haug

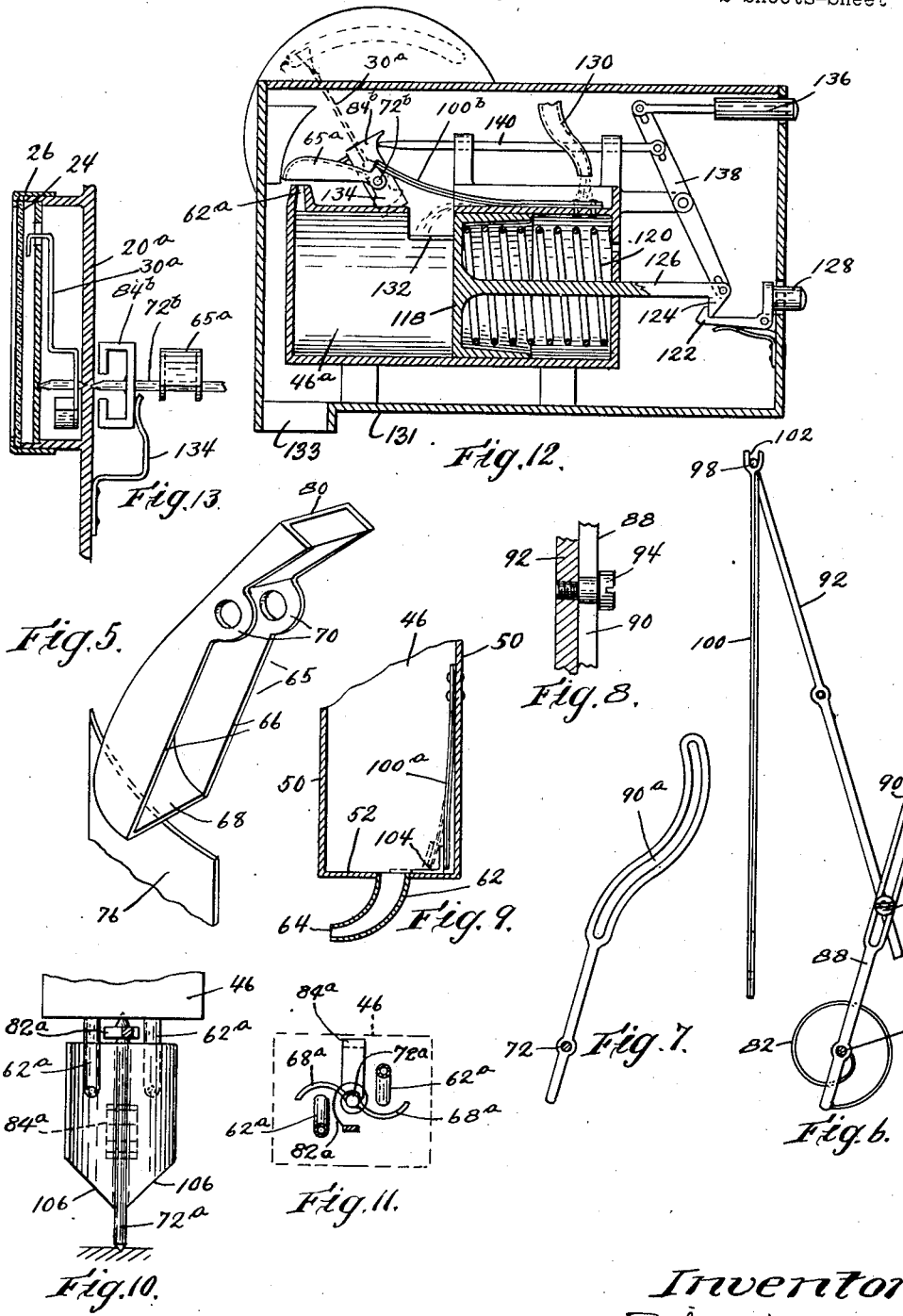

Patented Sept. 4, 1934

1,972,736

UNITED STATES PATENT OFFICE 1,972,736

VISCOSITY INDICATING DEVICE

Richard J. Haug, Nashua, N. H.

Application May 22, 1929, Serial No. 365,170

24 Claims. (Cl. 265—11)

This invention relates to devices adapted to measure the viscosity of liquids and especially of the lubricating oil in an automobile engine and to indicate when the oil is in poor condition.

One of the objects of the present invention is the provision of a small and reliable viscosity indicator wherein the oil or other liquid, the viscosity of which is to be measured, is caused to flow under a constant head or pressure onto a displaceable member and to displace it in proportion to the viscosity of the liquid acting thereon, combined with means to indicate the displaced position of the member.

Another object of the invention is the provision of improved means for modifying the operation of the device in accordance with the temperature of the liquid, whereby to compensate for changes in viscosity due to variations in temperature.

Another object of the invention is the provision of a viscosity indicator having a displaceable member that is acted upon by the liquid wherein temperature compensating means is provided which acts upon the displaceable member to counteract the increased action of the liquid thereon due to an elevated temperature thereof.

A further object of the invention is the provision of a displaceable member which is acted upon by a stream of the fluid under constant head or pressure, the displaceable member being pivotally supported and shaped to be reacted on by the fluid leaving said member.

The viscosity indicator embodying the present invention includes an indicating compartment having a wall which is transparent at least in part and a second compartment containing the mechanism that is acted upon by the oil or other fluid, the viscosity of which is adapted to be indicated by the device.

It is an object of the present invention to provide means to maintain said two compartments entirely free from fluid intercommunication so that the transparent wall shall not become covered with a film of oil and its transparency impaired.

Another object of the invention is the provision of an indicating needle or the equivalent in the indicating compartment and actuating mechanism for the needle in the other compartment; the compartments being isolated from fluid intercommunication and the needle being free from positive connection with the actuating mechanism, and electro-magnetic means being provided to cause the indicating needle to follow the movements of the actuating mechanism.

Since the viscosity of the oil in an automobile engine does not deteriorate rapidly, for some purposes, it is not necessary to provide a viscosity indicating apparatus that gives a continuous indication of the viscosity of the oil whenever the engine is in operation. Consequently, it is an object of this invention to provide a viscosity indicating apparatus that can be operated whenever desired to indicate momentarily the viscosity of the oil at the time of operation and at other times will be inoperative.

Another object of the invention is the provision of a viscosity indicator wherein the oil is caused to flow out of an orifice of predetermined dimensions onto an indicating apparatus under constant pressure produced by means other than gravity, and specifically by a spring-urged piston.

Another object of the invention is to provide a viscosity indicator having a spring-urged piston to cause a flow of the liquid to be measured under constant head, with means adapted normally to hold the piston from operation and also to release the piston so that the device will operate to indicate the viscosity of the fluid and, further, to reset the piston and restress the spring after an operation thereof.

A further object of the invention is to provide an intermittently-operated viscosity indicator with an indicating needle or equivalent device that is held at its last moved indicating position between successive operations of the device.

A further object of the invention is generally to improve the construction and operation of viscosity indicators.

A viscosity indicating device having an indicating member actuated by the flow under constant head of the liquid to be measured and having temperature compensating means therefor is described and claimed broadly in my copending application Serial No. 647,778, filed October 26, 1925, which has eventuated into Patent No. 1,756,120 dated April 29, 1930, and the present invention is designed as an improvement over the invention shown and claimed in said application.

Fig. 5 is a perspective detail of the movable bucket and drop-removing plate.

Fig. 6 is a detail of the thermally-actuated means for compensating for variations in temperature of the liquid to be measured.

Fig. 7 is a view of a modified form of compensating lever.

Fig. 8 is a detail of the pivotal support between the compensating and actuating levers of Fig. 6.

Fig. 9 is a detail illustrating a modified manner of compensating for temperature variations.

Figs. 10 and 11 are side and plan views of a modified form of nozzle bucket arrangement which automatically compensates for variations from level of the device.

Fig. 12 is a modified form of the device shown in Figs. 1 through 4 adapted for intermittent operation and having a spring-urged piston instead of gravity to obtain a constant head of fluid at the nozzle.

Fig. 13 is an enlarged detail of the indicating needle and actuating member of Fig. 12 and illustrating more particularly the brake on the permanent magnet for holding the indicating needle in an operated position between successive operations of the device.

Figure 1:
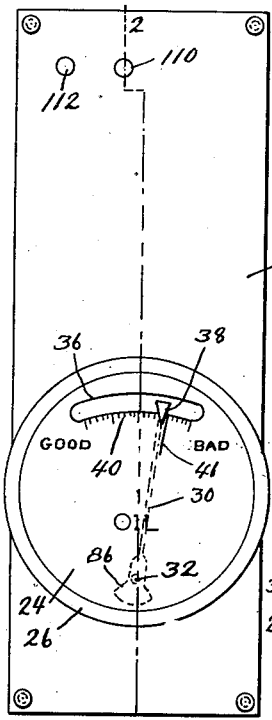
Fig. 1 is a front elevation of the viscosity indicator embodying the present invention.
Figure 2:
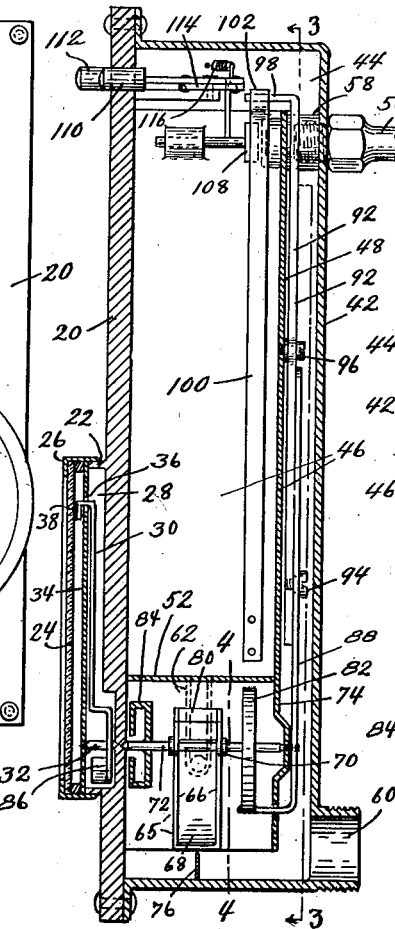
Fig. 2 is a sectional view taken along line 2—2 of Fig 1.
Figure 3:
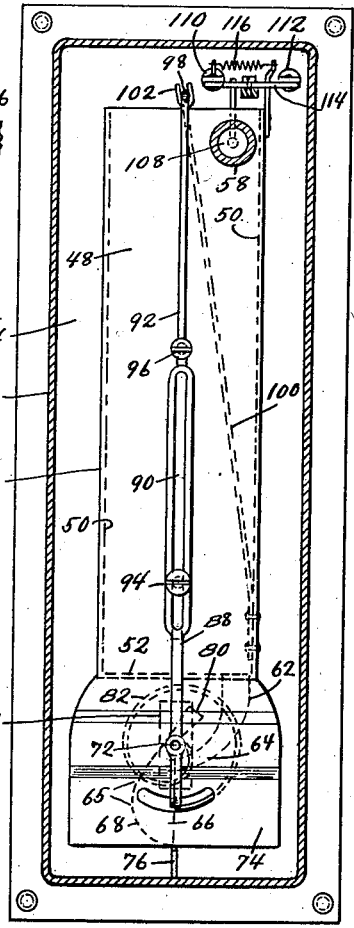
Fig. 3 is a sectional view taken along line 3—3 of Fig. 2.

That form of the invention illustrated in Figs. 1 through 4 includes a face plate 20, which also constitutes a supporting plate having on the lower portion of its front face a cylindrical casing 22 closed by a transparent wall 24 which is held to the casing by the ring 26. Said casing encloses a compartment 28 in which an indicating needle 30 is received. Said indicating needle is pivotally supported on a pivot shaft 32 which has a bearing in the plate 20 and also in a plate 34 which is located behind the transparent plate 24 and in front of the needle. Said plate 24 is provided with an elongated opening 36 in the upper portion thereof through which the free end 38 of the needle extends. Said end of the needle is movable over a scale 40 carried by the outer face of the plate 34, which scale is so arranged as to indicate the viscosity of the oil. When the needle is at the left hand end of the scale it indicates that the viscosity of the oil is high and when at the right hand portion of the scale indicates that the viscosity of the oil is low. The scale may have a prominent witness line 41 to indicate, when the needle is in register with said line, that the supply of oil in the engine should be replaced by fresh oil.

A vertically elongated casing 42 is secured in an oil tight manner to the rear face of the plate 20 and cooperates with said plate to enclose a compartment 44 through which the oil is adapted to flow.

A vertically-disposed oil tank 46 is located within said compartment and is composed of a rear wall 48, side walls 50 and a bottom wall 52. The plate 20 forms the front wall of said tank and is secured in a fluid tight manner with the aforesaid walls. The tank is freely open at the top. Oil is admitted to the tank from a pipe 56 which is screw-threaded in a boss 58 carried by the casing 42, which boss is extended through an opening in the rear wall 48 of the oil tank and is terminated therein. Oil is adapted to flow into said tank and out of the bottom thereof through a nozzle hereinafter to be described. The tank is adapted to be maintained full and to flow over the top of the end and side walls so that the head of oil in the tank, or the fluid pressure on the outlet of the nozzle, is constant. The oil flows into the bottom of the casing 42 and escapes through the outlet 60 thereof. The oil is adapted to flow out of the bottom of the tank 46 through a discharge nozzle 62 which is formed with a reduced outlet or orifice 64 that discharges oil horizontally into the upper end of a movable turbine bucket.

Figure 4:
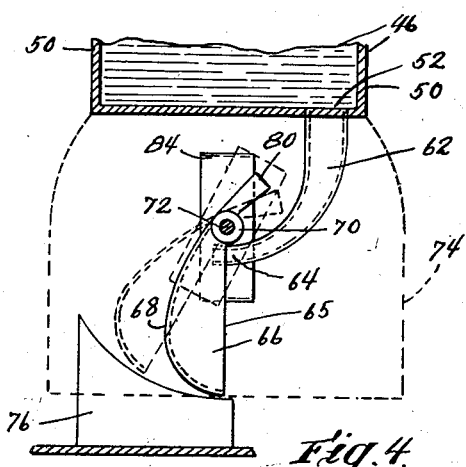
Fig. 4 is an enlarged detail taken along line 4—4 of Fig. 2.

Said bucket, see especially Figs. 4 and 5, consists of spaced side walls 66 and a bottom wall 68 which is disposed between said side walls and is of generally arcuate configuration. Said side walls are provided at their upper ends with ears 70 which are fixed to a pivot shaft 72 that is extended therethrough. The forward end of said shaft is pivoted in the front plate 20 in line with the pivot shaft 32 for the indicating needle. The rear end of said shaft is pivoted in the rear wall of a depending hood 74 which surrounds the nozzle 62 of the bucket and associated parts and prevents the oil which flows downwardly out of the open top of the tank from coming in contact with the bucket and associated parts. The pivot shaft 72 of the bucket is located immediately above the outlet of the nozzle so that the oil flowing from the nozzle is caused to impinge upon the rear wall of the bucket and thereby cause it to become angularly displaced. The lower end of the bottom wall of the bucket is approximately horizontal so that the reaction of the oil flowing therefrom also tends to move the bucket additionally in the same direction. A plate 76 is vertically disposed immediately beneath the middle of the bucket and has a sharp edge 78 which is closely adjacent the lower edge of the bucket in whichever position the bucket may occupy. Said plate is adapted to engage any drops of oil that may tend to adhere to the bucket and to remove the drops from the bucket whereby to prevent the weight of the drops from modifying the displaced position of the bucket due to the action of the fluid jet thereon. The side and bottom walls of the bucket are extended upwardly above the pivot shafts 72 as indicated at 80 and serve to partially counterbalance the weight of the main portion of the bucket. The bucket is maintained in a normal position, as when no oil is flowing from the nozzle 62, close to the outlet of said nozzle by suitable means which, as here shown, includes the spiral spring 82, the inner end of which is fixed to said shaft 72 and the outer end of which is suitably anchored to temperature compensating means hereinafter to be described. As thus arranged, the bucket is caused to be moved and held in various angularly-related positions depending upon the force of the jet of oil that impinges thereagainst. Since the flow of oil through an orifice is a function of the viscosity of the oil and increases with a decreased viscosity and since the head of oil which causes the flow is maintained constant, it follows that the displacement of the bucket away from the orifice of the nozzle can be made proportional to the velocity of the flow of the jet of oil and consequently inversely proportional to the viscosity thereof.

The compartments 28 and 44 are isolated from fluid intercommunication and consequently means are provided by which the indicating needle 30 can follow the movements of and thus indicate the various positions assumed by the bucket at any time. To this end, a permanent magnet 84 is affixed to the pivot shaft 72 of the bucket and has its poles terminated in close proximity to but free from actual contact with the rear wall of the front plate 20. The indicating needle 30 and especially that portion 86 of said needle which opposes the poles of the magnet is made of magnetic material. The plate 20 and especially that portion thereof disposed between the needle and the magnet is composed of non-magnetic material as brass or aluminum. Consequently, the needle is influenced by the magnet and is caused to follow the magnet and thus the bucket in its movements. The front plate 20 between the magnet and the needle is of reduced thickness whereby to reduce the gap between the poles of the magnet and the armature-portion 86 of the needle, thus to provide a strong pull on the needle by the magnet. Not only does the above arrangement permit a complete isolation of the two compartments but it also permits the bracket and needle to move freely and without such restriction as would necessarily be present if packed shafts or the like were employed to transmit the movement of the bracket to the middle through the front plate.

The viscosity of the oil is also a function of the temperature and diminishes as the temperature of the oil is increased. For some purposes, it is desirable to compensate for the change of viscosity of the oil when heated so that the actuating needle will indicate the viscosity of the oil as at some predetermined temperature. To this end, means are provided to increase the restraining action of the spring 82 on the bucket in proportion to the increased temperature of the oil. To this end, the outer end of the spring 82 is fixed to a compensating lever 88 which is pivoted to the rear wall of the hood 74 coaxially with the bucket shaft 72 and extends upwardly alongside the rear wall of the oil tank and has an elongated slot 90 in its upper end. Said lever is loosely pivoted to the lower end of an actuating lever 92 by means of a shoulder screw 94 which is received in the slot 90 and is screw threaded into the lower end of said actuating lever. Said actuating lever is pivotally supported intermediate its ends on a screw 96 carried by the rear wall of the oil tank and extends upwardly above said screw and has a horizontally-reflexed upper end 98 which overlies the top of the oil tank. A strip 100 of thermally-expansible material, consisting of two materials having different co-efficients of expansion secured together back-to-back, is disposed within said oil tank and has its lower end fixed to the bottom of the tank. Said strip has a bifurcated end or stirrup 102 in which the end 98 of the actuating lever is received. Said thermostatic element is adapted to assume various positions depending upon the temperature of the oil in which it is immersed and thus through said actuating lever 92 causes said compensating lever 88 to assume various positions and thus place various degrees of stress upon the spring 82. The arrangement is such that an elevated temperature of oil, which permits the oil to flow with increased velocity from its orifice, increases the stress on the spring to an extent sufficient to compensate for the increased velocity for the oil and its consequent reaction on the bucket, thereby to compensate for the increase in the reaction that is due to the increase of temperature. If the change of viscosity of the oil, due to temperature, does not happen to follow a straight line, the slot in the compensating lever 88 may have an outline, as indicated at 90a, Fig. 7, such as to conform with the curve of viscosity-change. The spring 82 and associated elements also serve to hold the bucket in any angular position thereof due to any casual inclination of the automobile on which the device is installed.

A modified form of temperature-compensating means is illustrated in Fig. 9 wherein the thermally-expansible element 100a located within the oil tank 46 actuates a valve member 104 to move it into various positions in front of the entrance to the nozzle 62, thus, to reduce the flow of oil through the nozzle as the temperature of oil is increased.

Figs. 10 and 11 illustrate a modified form of nozzles and bucket wherein the bucket is balanced at any instant regardless of the deviation of the device from a vertical position. In this modification, the bucket is pivoted in the middle about a vertical shaft 72a and has oppositely extended vanes 68a each of which is acted independently upon by the fluid discharged from the oppositely directed nozzles 62a extended from the bottom of the tank. The vanes 68a have downwardly inclined lower edges 106 which terminate at the shaft 72a so that drops that might tend to cling to the lower edges of the vane are drawn off the vanes along the shaft 72a. The magnet 84a for actuating the indicator, and the spring 82a for returning the vane to inoperative position are also applied to the vane.

The device above described will give a continuous indication of the viscosity of the oil so long as the oil is continuously supplied to the tank 46 in quantities sufficient to cause it to overflow. For some purposes, a continuous indication is not essential and it is sufficient to know the viscosity of the oil only at infrequent periods. Consequently, means are provided whereby the device can be put into and out of operation when desired. Said means includes a valve 108 which is arranged to close the oil opening in the boss 58. Said valve is closed by a closing button 110 and opened by an opening button 112, which buttons are located in the top portion of the front plate 20 and are connected to the ends of an intermediately-pivoted lever 114, which lever is connected with the valve 108. A spring 116 is connected with said lever in such a manner as to maintain the valve yieldingly in either one of its closed or open positions, depending upon which button has been last depressed. As thus arranged, the button 112 can be depressed to start the apparatus in operation. After an indication has been observed, the button 110 can be depressed thereby to stop the flow of oil through the apparatus until a second indication is needed.

In the modification illustrated in Fig. 12, the constant head of oil is maintained by a piston 118 which is movable toward the closed end of the oil tank or cylinder 46a under the urge of a spring 120. The piston and spring are maintained in an unoperated and spring-stressed position by a spring-urged latch 122 which engages a detent 124 on the end of the piston rod 126. The latch can be released by a push button 128 whereby to permit the spring to move the piston. The tank is provided with a discharge orifice 62a at its closed end which underlies the horizontally pivoted bucket 65a which is essentially identical with the previously described bucket 65.

A magnet 84b is fixed to the pivot shaft 72b of the bucket and actuates, through an isolating partition 20a, an indicating needle 30a. A strip 100b of thermostatic material has its free end bearing against the bucket 65a and constitutes not only a spring to maintain the bucket in a normal position in front of the nozzle but means to compensate for changes in viscosity of the oil due to temperature variations thereof. The oil is adapted to flow from a supply pipe 130 onto said thermostatic element and thence through an inlet port 132 into the interior of the oil tank whereby to maintain a supply of oil therein. Surplus oil overflows into the enclosing housing 131 and escapes through the outlet 133. When the piston is released for movement it first passes over said port and closes it and then acts upon the entrapped oil in the tank to force it under constant head or pressure through the nozzle 62a and onto the bucket 65a. The bucket will thus be moved into some position corresponding with the velocity of oil issuing from the nozzle. The restraining spring-pressure on the bucket caused by the thermostatic member 100b is varied in proportion to the temperature of the oil by the expansion and contraction of said member due to variations of the oil temperature.

Means are provided to maintain the indicating needle 30a in an operated position between periods of operation. To this end, a light brake spring or shoe 134 bears upon a moving part of the bucket system, as the magnet 84, with sufficient force to hold it in whatever position it may be moved, although not with sufficient force to restrict the free operation of the bucket system. Since the electro-magnet is held in fixed position between periods of operation the magnet also holds the indicating needle 30a in operated position.

The piston may be reset after an operation thereof by a resetting push button 136 which is connected with one end of an intermediately-pivoted resetting lever 138, the other end of which is pivotally connected with the piston rod 126. The resetting movement of the piston also is utilized to reset the bucket system by means of a rod 140 which is connected with a resetting lever and is engageable with the permanent magnet 84 of the bucket system.

I claim:

1. A viscosity measuring device including means to provide a flow of fluid under constant head and at a velocity which varies in accordance with variations in viscosity of the fluid, a member acted upon by the flowing fluid and displaced thereby into one of several positions which one is indicative of the viscosity of the fluid, and means including a thermally-controlled spring acting on said member in opposition to the action of the fluid.

2. A viscosity measuring device including means to provide a flow of fluid under constant head and at a velocity which varies in accordance with variations in viscosity of the fluid, a member acted upon by the flowing fluid and displaced thereby into one of several positions which one is indicative of the viscosity of the fluid, and means including a thermally-controlled spring having an element subjected to the temperature of the fluid, said spring acting on said member in opposition to the action of the fluid.

3. A viscosity measuring device including means to provide a flow of fluid under constant head and at a velocity which varies in accordance with variations in viscosity of the fluid, a member acted upon by the fluid and displaceable thereby into one of a plurality of positions which one is indicative of the viscosity of the fluid, and means governed by the temperature of the fluid to modify the displaced position of said member.

4. A viscosity measuring device including means to provide a flow of fluid under constant head and at a velocity which varies in accordance with variations in viscosity of the fluid, a member acted upon by the fluid and displaceable thereby into one of a plurality of positions which one is indicative of the viscosity of the fluid, and means governed by the temperature of the fluid acting on said member in opposition to the fluid to modify the displaced positions of said member, whereby to compensate for variations in flow of the fluid due to variations of temperature thereof.

5. A viscosity measuring device including means to provide a flow of fluid, a member acted upon by the flowing fluid and displaceable thereby into one of a plurality of viscosity-indicating positions, and means including an element immersed in the fluid and responsive to variations in temperature thereof and acting on said member in opposition to the fluid to modify the position assumed by said member under action of the fluid, whereby to compensate for variations on flow of the fluid due to variations of temperature thereof.

6. In a viscosity indicating device, means providing an orifice, means supplying said orifice with fluid under constant head, and a turbine bucket located in front of said orifice in position to be impinged upon by the fluid issuing therefrom and displaced thereby into one of a plurality of positions remote from said orifice which one is indicative of the viscosity of the fluid.

7. In a viscosity indicating device, means providing an orifice, means supplying said orifice with fluid, a turbine bucket located in front of said orifice and displaceable by the fluid issuing from said orifice into one of a plurality of positions remote therefrom which one is indicative of the viscosity of the fluid, and means acting on said bucket in opposition to the action of the fluid arranged to modify the position assumed by the bucket at any time in accordance with variations of temperature of the fluid and which temperature affects the action of the fluid on said bucket.

8. In a viscosity indicating device, means providing an orifice, and a pivotally-supported bucket located in front of said orifice in position to be acted upon by the fluid discharged from said orifice and moved thereby into one of a plurality of positions which one is indicative of the viscosity of the fluid.

9. In a viscosity indicating device, means providing an orifice, means supplying said orifice with liquid under constant head and from which orifice the liquid flows at a velocity which varies with variations in viscosity of the liquid, and a pivoted bucket having a recess into one portion of which the liquid from said orifice is forcibly discharged and from another portion of which the liquid leaves said bucket, said bucket being movable by the action of the liquid thereon into one of a plurality of positions which one is indicative of the viscosity of the liquid.

10. In a viscosity indicating device, means providing an orifice, means supplying said orifice with fluid under constant head, and a pivoted bucket having a curved wall one portion of which is located in front of said nozzle and from another portion of which the fluid leaves the wall, said bucket being arranged to be displaced away from said orifice by the action of the fluid thereon into a position which is indicative of the viscosity of the fluid.

11. In a viscosity indicating device, a pivoted bucket having spaced side walls and a curved bottom wall located between said side walls, a nozzle located in front of said bottom wall and between said side walls in position to discharge fluid into said bucket, and means to supply said nozzle with fluid under constant head, said bucket being displaceable from said nozzle by the fluid into a position which is indicative of the viscosity of the fluid.

12. In a viscosity indicating device, means providing an orifice, means supplying said orifice with fluid, and a pivoted bucket located in front of said orifice into which the fluid is discharged, said bucket having means to guide fluid to flow therefrom in a direction that is opposite to the direction of flow of fluid from said orifice, and said bucket being displaceable by the fluid flowing thereonto and therefrom into a position which is indicative of the viscosity of the fluid.

13. In a viscosity indicating device, means providing an orifice, means supplying said orifice with fluid, a pivoted bucket located in front of said orifice into which the fluid is discharged, said bucket having means to guide fluid to flow therefrom in a direction that is opposite to the direction of flow of fluid from said orifice, and said bucket being displaceable by the fluid flowing thereonto and therefrom into a position which is indicative of the viscosity of the fluid, and means governed by the temperature of the fluid to maintain said bucket in a normally unoperated position and also to modify the position assumed by the bucket at any time in response to its reaction with the fluid, whereby to compensate for changes in fluid flow due to variations in temperature of the fluid.

14. In a viscosity-indicating device, means providing a fluid jet, a movable member which is located in position to be impinged against by said jet and displaced thereby into a position which is indicative of the viscosity of the fluid, and means to remove fluid drops from their adherency with said member.

15. In a viscosity-indicating device, means providing a fluid jet, a movable member which is located in position to be impinged against by said jet and displaced thereby into a position which is indicative of the viscosity of the fluid, and means to remove fluid drops from their adherency with said member, including a plate having a sharp edge which is closely adjacent the lowermost portion of said movable member and confronts the path of movement thereof.

16. In a viscosity-indicating device, means providing an orifice, means for supplying said orifice with fluid, a movable member disposed in front of said orifice in position to be acted upon by the fluid issuing from said orifice and moved by the action of the fluid thereon into a position that is indicative of the viscosity of the fluid, said fluid supply means including means operable at will to permit fluid to impinge upon said fluid-actuated member, an indicating device having means responsive to and movable into an indicating position by the movement of said fluid actuated member, and means to hold said indicating device releasably in an actuated position thereof.

17. A viscosity-indicating device including means providing an orifice, a movably mounted member disposed in confronting relation with said orifice and movable by the fluid flowing therefrom into a position which is indicative of the viscosity of the fluid, means to supply said orifice with fluid under constant head including a receptacle for the fluid in communication with said orifice, and a spring-urged piston arranged to act on the fluid in said receptacle.

18. A viscosity-indicating device including means providing an orifice, a movably mounted member disposed in confronting relation with said orifice and movable by the fluid flowing therefrom into a position which is indicative of the viscosity of the fluid, means to supply said orifice with fluid under constant head including a receptacle for the fluid in communication with said orifice, a spring-urged piston arranged to act on the fluid in said receptacle, and means normally holding said spring-urged piston in an unoperated position thereof.

19. A viscosity-indicating device including means providing an orifice, a movably mounted member disposed in confronting relation with said orifice and movable by the fluid flowing therefrom into a position which is indicative of the viscosity of the fluid, means to supply said orifice with fluid under constant head including a receptacle for the fluid in communication with said orifice, a spring-urged piston arranged to act on the fluid in said receptacle, means normally holding said spring-urged piston in an unoperated position thereof, and releasing means for said holding means.

20. A viscosity-indicating device including means providing an orifice, a movably mounted member disposed in confronting relation with said orifice and movable by the fluid flowing therefrom into a position which is indicative of the viscosity of the fluid, means to supply said orifice with fluid under constant head including a receptacle for the fluid in communication with said orifice, a spring-urged piston arranged to act on the fluid in said receptacle, means normally holding said spring-urged piston in an unoperated position thereof, releasing means for said holding means, and means to restore said operated piston subsequently to an unoperated position.

21. A viscosity-indicating device including means providing an orifice, a movably mounted fluid-actuated member disposed in confronting relation with said orifice in position to be acted upon by the fluid flowing therefrom and moved by the fluid into a position indicative of the viscosity of the fluid, means supplying said orifice with fluid under constant head including a receptacle having communication with said orifice, means arranged to keep said receptacle full and overflowing, and a spring-urged piston located in said receptacle in a position to force fluid through said orifice.

22. A viscosity-indicating device including means providing an orifice, a movably mounted fluid-actuated member disposed in confronting relation with said orifice in position to be acted upon by the fluid flowing therefrom and movable into a position which is indicative of the viscosity of the fluid, a fluid-containing receptacle having communication with said orifice and adapted to be normally full of fluid and having an opening remote from said orifice through which the receptacle can overflow, a piston located in said receptacle, means normally holding said piston from operation, and means to move said piston in said receptacle in a direction to close said overflow opening and thence to force fluid out of said nozzle.

23. A viscosity-indicating device including means providing an orifice, a movably mounted fluid-actuated member disposed in confronting relation with said orifice in position to be acted upon by the fluid flowing therefrom and movable into a position which is indicative of the viscosity of the fluid, a fluid-containing receptacle having communication with said orifice and adapted to be normally full of fluid and having an opening remote from said orifice through which the receptacle can overflow, a piston located in said receptacle, means normally holding said piston from operation, means to move said piston in said receptacle in a direction to close said overflow opening and thence to force fluid out of said nozzle, and manual releasing and resetting means for said piston.

24. A fluid-indicating device including means providing an orifice, a viscosity-indicating device which is movable in response to the flow of fluid from said orifice away from a normal position into a position which is indicative of the viscosity of the fluid, a receptacle for fluid having communication with said orifice, a spring-urged piston adapted to force fluid from said receptacle through said orifice, means normally holding said piston from operation, means to release said holding means, and means to reset said piston and to restore said indicating device to normal position.

RICHARD J. HAUG.